United States Patent [19]

Schwab et al.

[11] Patent Number: 4,516,125
[45] Date of Patent: May 7, 1985

[54] METHOD AND APPARATUS FOR MONITORING VEHICLE GROUND MOVEMENT IN THE VICINITY OF AN AIRPORT

[75] Inventors: Carl E. Schwab, Huntington Station; David P. Rost, Malverne; William Hackenberg, Farmingdale; Paul Holcombe, Huntington, all of N.Y.

[73] Assignee: General Signal Corporation, Stamford, Conn.

[21] Appl. No.: 419,886

[22] Filed: Sep. 20, 1982

[51] Int. Cl.³ .............................................. G01S 13/52
[52] U.S. Cl. .................................. 343/7.7; 343/5 LS; 343/5 PD; 343/5 MM
[58] Field of Search .................... 343/7.7, 5 MM, 455, 343/456, 457, 5 LS, 5 GC, 5 PD

[56] References Cited

U.S. PATENT DOCUMENTS

| | | | |
|---|---|---|---|
| 3,872,474 | 3/1975 | Levine | 343/5 LS |
| 3,879,728 | 4/1975 | Wolff | 343/5 MM |
| 3,890,616 | 6/1975 | Kojima et al. | 343/5 MM |
| 4,072,944 | 2/1978 | Bianco et al. | 343/7.7 |
| 4,104,633 | 8/1978 | Donahue et al. | 343/7 A |
| 4,181,956 | 1/1980 | Schwab et al. | 364/521 |
| 4,287,584 | 9/1981 | Tanimoto et al. | 368/63 |
| 4,292,470 | 9/1981 | An | 179/1.5 D |
| 4,382,291 | 5/1983 | Nakauchi | 343/5 PD |

OTHER PUBLICATIONS

Skolnik, Merrill I., "Systems Engineering and Design", *Introduction to Radar Systems*, McGraw-Hill Book Co., New York, 1962, pp. 579–581.

*Primary Examiner*—Theodore M. Blum
*Attorney, Agent, or Firm*—Pollock, Vande Sande & Priddy

[57] ABSTRACT

The invention provides an apparatus for processing radar returned video signals in the vicinity of an airport including at least one runway and at least one vehicle roadway intersecting the runway, in order to assist air traffic controllers in detecting potential hazardous situations. Radar returns from each of plural geographic monitored locations are compared with a simulated return for each corresponding location to detect a moving object at any of said geographic monitored locations. The presence of a moving object at one of such locations may be indicative of a hazardous situation, and in that event, the air traffic control operator may be warned by an alarm or the like.

17 Claims, 15 Drawing Figures

ILLUSTRATION OF 100 RANGE AZIMUTH CELL (5 IN AZ; 20 IN RANGE)

though intersecting runways are sometimes used in timed sequence. At larger airports there may even be pairs of parallel runways. In addition to take off and landings, aircraft movements at an airport also include taxiing to and from runways, and to this end a system of taxiways is also provided connecting the gates, at which passengers may embark or disembark from aircraft, and the runways.

METHOD AND APPARATUS FOR MONITORING VEHICLE GROUND MOVEMENT IN THE VICINITY OF AN AIRPORT

DESCRIPTION

1. Field of the Invention

The present invention relates to apparatus to monitor the movement of vehicles and other objects in the vicinity of an airport to maintain or increase the effectiveness of control procedures so that hazardous situations can be minimized or prevented.

2. Background Art

Typically, present day airports include one or more aircraft runways which are provided for take off and landing functions of aircraft. To take advantage of prevailing wind directions, a typical airport may include several intersecting runways, only one of which will be in use at any particular time, although intersecting runways are sometimes used in timed sequence. At larger airports there may even be pairs of parallel runways. In addition to take off and landings, aircraft movements at an airport also include taxiing to and from runways, and to this end a system of taxiways is also provided connecting the gates, at which passengers may embark or disembark from aircraft, and the runways.

Because of the speed at which aircraft may travel in the vicinity of an airport, even when still on the ground, and the mass of the aircraft, it is crucial that aircraft movements be monitored and controlled to ensure that aircraft are not allowed to move when the path has not been cleared, to ensure that any attempt to cross in the path of a moving aircraft be prevented, and finally ensure that aircraft actually move over the path in which they have been cleared to travel. The burden of controlling the aircraft movements has been placed on aircraft controllers and/or control tower personnel (generically referred to hereinafter as controllers), who may monitor aircraft movements either visually or with the aid of instruments. This burden is particularly heavy during periods of poor visibility.

What is required to reduce the controllers' workload is a system or method to monitor and allow ready control of aircraft ground movements including:

1. Monitor aircraft and vehicle motion in a selected area;
2. Allow the routing of aircraft to be quickly and easily changed by the controller;
3. Provide ready indication of a potentially dangerous situation;
4. Automatically reconfigure after monitoring is no longer necessary, for example because an aircraft has taken off, or has turned off a runway after landing; and
5. Provide flexibility to allow the controller to selectively activate and deactivate the system.

Efforts have been made in the past to assist the controller with little success. The parameters which have been used to assess past efforts have included:

1. Flexibility with regard to changing traffic flow;
2. Reliability;
3. Installation costs;
4. Maintenance costs; and
5. The effect the improvements have on the controllers' workload.

The last-mentioned factor is by far the most significant.

The most recent of these past efforts have included vehicle detectors and signal lights (akin to automobile traffic lights) and other paraphernalia typically used in automobile traffic control.

Previous approaches have had two significant disadvantages. Those approaches had the characteristic of omitting the controller from initiating a supervised route and omitting the controller in the feedback loop to inform him as to the successful completion of a vehicle's travel over a route. In addition, the discrete vehicle sensors (for example inductively operating devices) and vehicle signalling devices (for example automobile-like traffic lights) required very extensive wiring. The distances involved in a typical airport (measured in miles) meant the costs of installing and maintaining this equipment was prohibitive.

Other efforts at overcoming poor visibility conditions have required the presence of additional personnel, and perhaps additional equipment dedicated to the additional personnel. See, for example, "Introduction to Radar Systems", by Skolnik, (McGraw-Hill, 1962), particularly pp. 579–581. Since poor visibility conditions are present only a fraction of the time, these solutions are not cost-effective.

It is therefore an object of the invention to provide an apparatus for protecting selected aircraft movements, especially from intrusion by other vehicles. It is another object of the invention to provide for flexible route selection by and feedback to a controller. It is another object of the invention to provide for poor visibililty operation without requiring additional personnel or equipment dedicated to such additional personnel.

SUMMARY OF THE INVENTION

The present invention is based on the realization that aircraft ground radar equipment can be used as a vehicle sensor. Where airports are now equipped with ground radar equipments, the adaptation of signals from such equipment for use in a vehicle monitoring system is relatively inexpensive. This adaptation is used in conjunction with a flexibly configured command input and output system which ensures that the aircraft controller can flexibly designate routes which are or should be protected. Feedback from the equipment informs the controller (without requiring significant amounts of controller time) as to the successful completion of a commanded movement and/or the violation of a protected route. Completion of the route can be used to deactivate protection without additional controller action.

For example, a controller can initiate a command input to the apparatus representing both a selected function and a selected runway. The selected runway indicates the route which should be protected against intrusion by other vehicles, and the selected function is used by the equipment to automatically disable protection for the route based on predetermined occurrences. For example in a take off function, radar originated signals can be used to detect the initiation of an aircraft's take off roll. Once the aircraft has begun rolling down the runway which the controller had previously cleared for take off, it can be safely assumed that after a predetermined time the aircraft will have left the ground and the protection can be disabled. In a similar fashion, in a landing function, designating a particular runway is used to determine the area which is to be protected and is also used to designate one or a very few runway turnoffs that will be used by the aircraft after it has completed its landing. Accordingly, when a landing function has been selected, and the equipment identifies a vehicle passing through an area designated as a turn off, the protection for the runway used in the landing function can be deactivated.

Critical to the use of radar originated signals, is the ability to correlate the radar video output with specific geographic positions. In addition, it is also necessary for the equipment to be able to distinguish between radar returns representing stationary or near-stationary objects and radar returns representing moving objects. While some stationary objects could be hazardous to aircraft movements, other objects which produce radar returns, e.g. rain, grass, puddles, landing lights and other fixtures, are not. Therefore, it is reasonable to require periodic runway and taxiway visual checks to certify that these paths are cleared of hazardous stationary objects. Such checks can occur widely spaced in time, e.g. once per day. Once such a check has occurred, the radar returns will catch an object (truck, etc.) moving into a protected area. Since stationary objects will not be a hazard, they can safely be ignored. Essentially, radar returns from any geographic location are periodic in time, synchronous with the rotation of the radar antenna. Radar video signals correlated with a geographic location can be processed using conventional mathematical functions to produce a simulated return indicative of stationary objects in or near the geographic location. Accordingly, radar returns from that geographic location which are within a predetermined threshold of the simulated return can be assumed not to represent radar returns from moving objects. On the other hand, a radar return, which is significantly different from the simulated return, may well indicate the presence of a moving object. In this fashion, moving objects can be readily identified and correlated with specific geographic locations.

A test was performed using ASDE-3 equipment at FAATC, Atlantic City, N.J., with a 100 cell test detection area as illustrated in FIG. 9 and located at 4 locations as illustrated in FIG. 10. The radar video in each cell was digitized to 8-bits and stored for each antenna azimuth scan. Antenna scan rate was 1 revolution per second. The range and azimuth resolution parameters are such that an elemental target will fill one of the cells; hence motion in any direction will disturb the digitized value in its occupied cell plus at least one of the adjacent cells.

These digitized values were transferred, once a second, to the memory of an HP-9825 desk calculator and stored as a data array. The calculator was configured to subtract each data array from the prior corresponding data array on an element by element basis to form a difference array consisting of the scan to scan differences. This difference array was processed with a summation of absolute value algorithm and shown capable of detecting targets from small vehicles up to large aircraft at speed ranging from a few miles per hour up to 60 mph. The summation of absolute values was compared to a settable threshold and a tone was sounded on each scan if the threshold was exceeded. Thus, the test used, as a simulated return, the return from the prior scan.

Accordingly, the invention provides an apparatus for processing radar return video signals in the vicinity of an airport including at least one runway and at least one vehicle roadway intersecting said runway. The vehicle roadway could represent a taxiway used by aircraft, another roadway used by non-aircraft vehicles, or another runway.

The apparatus includes first means responsive to a command input representing a selected function and a selected runway to select a set of monitored locations (or barriers) from plural sets of monitored locations. More particularly, selecting a runway identifies the geographic location of all intersections of that runway with other runways, taxiways or roadways. A monitored location or barrier is located at each intersection so as to enable identification of a vehicle entering the intersection (or violating the barrier). In practice, all runway intersections can be predetermined and identification of these intersections stored in a table. For these purposes, identification of a monitored location or barrier corresponds to four parameters (start and end azimuth, and start and end range) for each barrier, allowing the radar return from the barrier to be isolated. Each barrier must have significant dimensions in azimuth and range. This means that the return for each barrier will span several range sweeps at different azimuths.

In this fashion the geographic locations to be monitored are determined. Each runway is associated with a selected set of locations to be monitored. Selecting the function identifies the manner in which the protection can be automatically disabled. For example, in a landing function, selection of a runway can be used to identify one or a few possible turn off intersections for that runway that will be used when the aircraft has landed. The protection can be automatically disabled when a vehicle is detected moving from the runway through a turn off intersection. For the take off function, identification of the runway identifies the geographic location through which the aircraft will pass as it begins its take-off roll. Allowing a predetermined amount of time for the aircraft to leave the ground once it has passed the take off roll can be used to disable the protection.

The apparatus also includes second means responsive to a real time video signal from a radar apparatus for repeatedly isolating radar returns from each geographic monitored location in said selected set. With geographic locations to be monitored having been selected (by the selection of a runway) the real time radar returns correlated with each of those geographic locations can be isolated. Since the radar returns from each geographic location are periodic and synchronous with the rotation of the radar antenna, real time radar returns from each of the geographic locations being monitored are repeatedly received. Each return is repeatedly isolated for processing.

In order to detect a moving object in the monitored geographic location, the apparatus further includes third means for repeatedly comparing radar returns from each of plural geographic monitored locations with a simulated return corresponding to that location to detect a moving object at the geographical monitored location. The simulated return can simply be the return detected on the previous scan (1 second earlier) or a previous scan several scans (or seconds) earlier. In this fashion, slower moving targets can be detected and longer term effects can be discriminated against. The simulated return can be varied quite readily giving the invention an adaptability as compared with standard doppler processing moving target indicating radars. Alternatively, the simulated return can be an average return from the monitored location or some other mathematical combination of plural returns from the monitored location. The generation of the simulated return and the following comparison with the present return, effects a clutter filtering process whereby moving objects can be more easily identified.

Finally, the apparatus includes alarm means responsive to detection of a moving object by said third means for alerting an operator to the presence of said moving object. The alarm means for example is responsive to the difference between a real time radar return and the simulated radar return for the corresponding geographic location.

Ancillary apparatus provides operator output, in addition to the above-mentioned alarm means, under a variety of circumstances. For example, it may be desirable to provide a distinctive output at the time protection is disabled. This provides a recognizable safety check since the controller can verify for himself that the distinctive output occurs when a controlled aircraft has executed a movement authorizing such disablement, for example a controlled aircraft has left the runway on takeoff, or has turned off a runway after a landing function. In addition, and if desired, another distinctive output is produced when a controlled aircraft has begun its takeoff roll. This provides a check on pilot operation in the event the takeoff roll has not been authorized. Preferably, these two outputs as well as the alarm output are provided in the form of distinctively different audio tones. On the other hand, synthetic voice responses could be used instead, see for example, U.S. Pat. No. 4,287,584.

The command input, referred to above, is implemented using one of several different input devices. One simple input device is a keyboard which includes at least takeoff and landing function keys as well as a key to identify each of the potential runways. The operator inputs a command by merely stroking the appropriate keys. Alternatively, voice input devices are now available which are capable of readily recognizing a limited vocabulary of commands required for system operation, see, for example, U.S. Pat. No. 4,292,470. Another type of input device that could be used is a light pen in conjunction with a video or other display of potential barrier locations. If a voice input device is employed, an additional distinctive output tone or synthesized voice output is generated to indicate that the audio input device has recognized a command input within its repertoire; this is useful to indicate to the operator that his command has been accurately accepted. Alternatively, or in addition to this distinctive tone to indicate recognition by the audio input unit, an additional distinctive tone can be generated to indicate lack of recognition of the audio input.

Accordingly, the invention provides apparatus for processing radar return video signals in the vicinity of an airport including at least one runway and at least one vehicle roadway intersecting said runway, said apparatus comprising:

first means responsive to a command input representing a selected function and a selected runway to select a set of geographical monitored locations from plural sets of monitored locations, second means responsive to a real time video signal from a radar apparatus for repeatedly isolating radar returns from each geographic monitored location in said selected set, third means for repeatedly comparing radar returns from each of plural geographic monitored locations with a simulated return for each corresponding location to detect a moving object at any of said geographic monitored locations, and alarm means responsive to detection of a moving object by said third means for alerting an operator to the presence of said moving object.

In accordance with a method aspect of the invention, the invention provides a method of monitoring vehicle ground movements to detect violations of protected roadways comprising the steps of:

sweeping an area encompassing said protected roadway with microwave energy in a cyclical pattern, deriving a video signal from the reflected microwave energy, selecting predetermined time slices of said video signal corresponding to intersections of a protected roadway with other roadways, in each of a number of said cyclical sweeps, comparing at least one of said predetermined time slices of said video signal in one sweep with a simulated signal related to said predetermined time slices in a prior sweep, and producing an alarm in the event said predetermined time slices of said video signal differs from said simulated signal by more than a predetermined threshold.

BRIEF DESCRIPTION OF THE DRAWINGS

The present invention will now be described in such detail as to allow those skilled in the art to make and use the same, in the following portion of the specification when taken in conjunction with the attached drawings in which like reference characters identify identical apparatus, and in which:

FIG. 10 illustrates the locations of the different barriers used in the test described below;

DETAILED DESCRIPTION OF PREFERRED EMBODIMENTS

Figure 1:
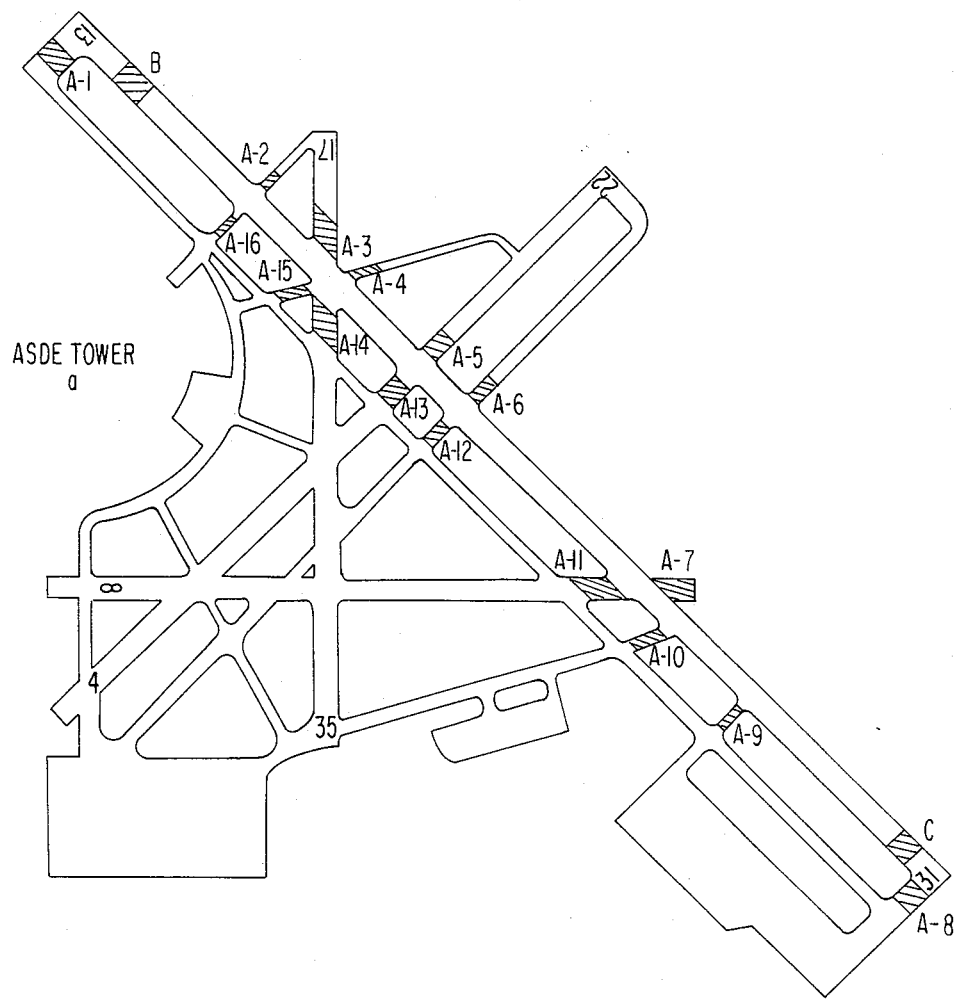
FIGS. 1–5 and 10 show a plan view of an exemplary airport with superimposed thereon barrier locations for various runways and functions.

FIG. 1 is a plan view of the Federal Aviation Administration Technical Center (FAATC) situated in Atlantic City, N.J. which will be used as an example in explaining operation of the system described herein. FIG. 1 illustrates several runways and an interconnecting system of taxiways. As is conventional in industry designation, the runway designation is located at the beginning (the area at which an aircraft executing takeoff, begins its roll, or in the vicinity of the point at which an aircraft will first touch down, in executing a landing) of the runway. A convention is that these numbers are the magnetic heading in 10's of degrees. Accordingly, runways 13 and 31 use a common section of runway, from different ends. Also shown are runways 22, 4, 35 and 17 which intersect runways 13 and 31 at various angles. FIG. 1, is drawn assuming that runway 13 is the active runway and in order to protect an aircraft taking off or landing on runway 13, a plurality of barriers are electronically created; these are designated A-1 through A-16 in FIG. 1. It will be understood that the barriers exist only in the electronic apparatus and that there is no tangible objects adjacent the runways. As is apparent from FIG. 1, no vehicle can enter runway 13 without crossing one of the electronic barriers A. Also associated with the protection for runway 13 is another electronic barrier B which is used to indicate initiation of the aircraft's takeoff roll, and is also used to indicate premature takeoff. Each of the electronic barriers (A and B) correspond to predetermined time slices within the 360° sweep of a radar signal.

In the event runway 31 is in operation rather than runway 13, protection is provided by the identical A areas, and the premature takeoff detector area B is relocated at C. Those skilled in the art will understand that since operations using runway 13 or 31 are mutually exclusive, when either of these runways is in use there will be only an area B or only an area C, also in use.

Figure 2:
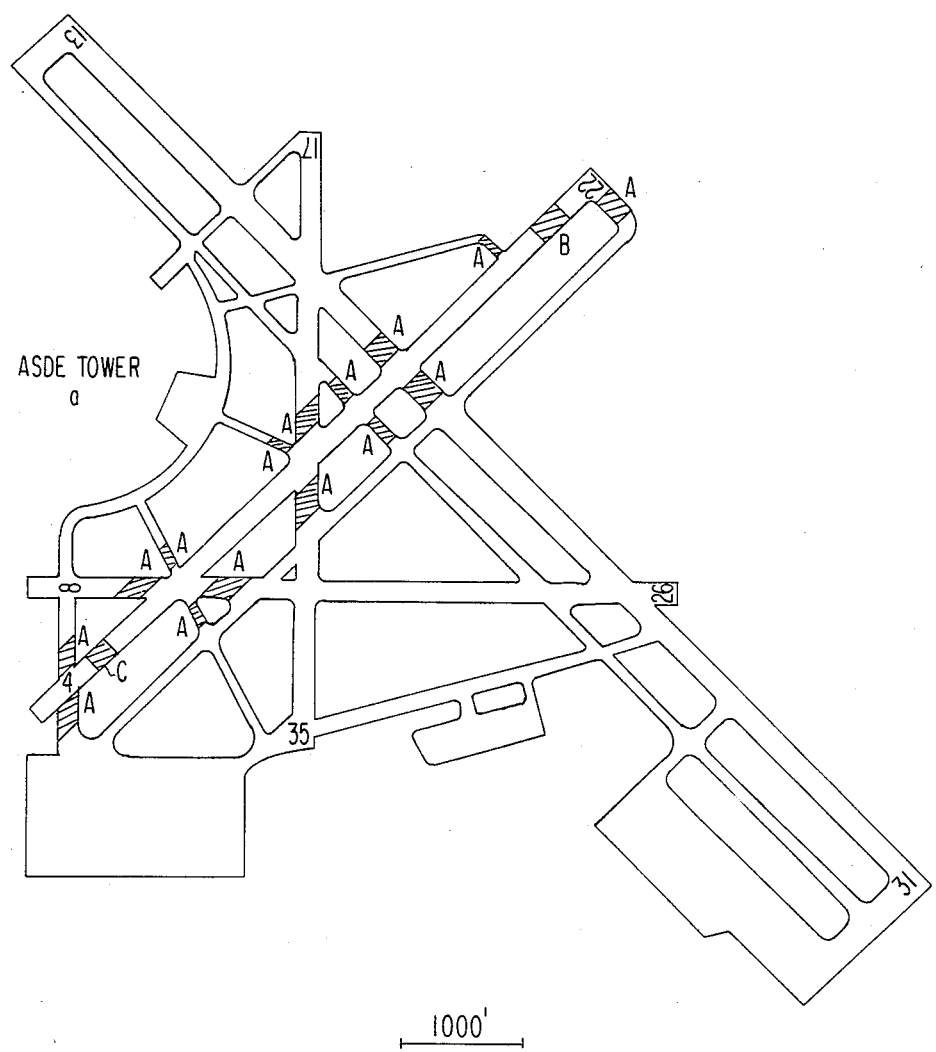

FIG. 2 is a similar illustration for runway 22. As was the case with FIG. 1, when runway 4 is in use rather than runway 22, the same A areas are employed and the area B is relocated to the region C.

Figure 3:
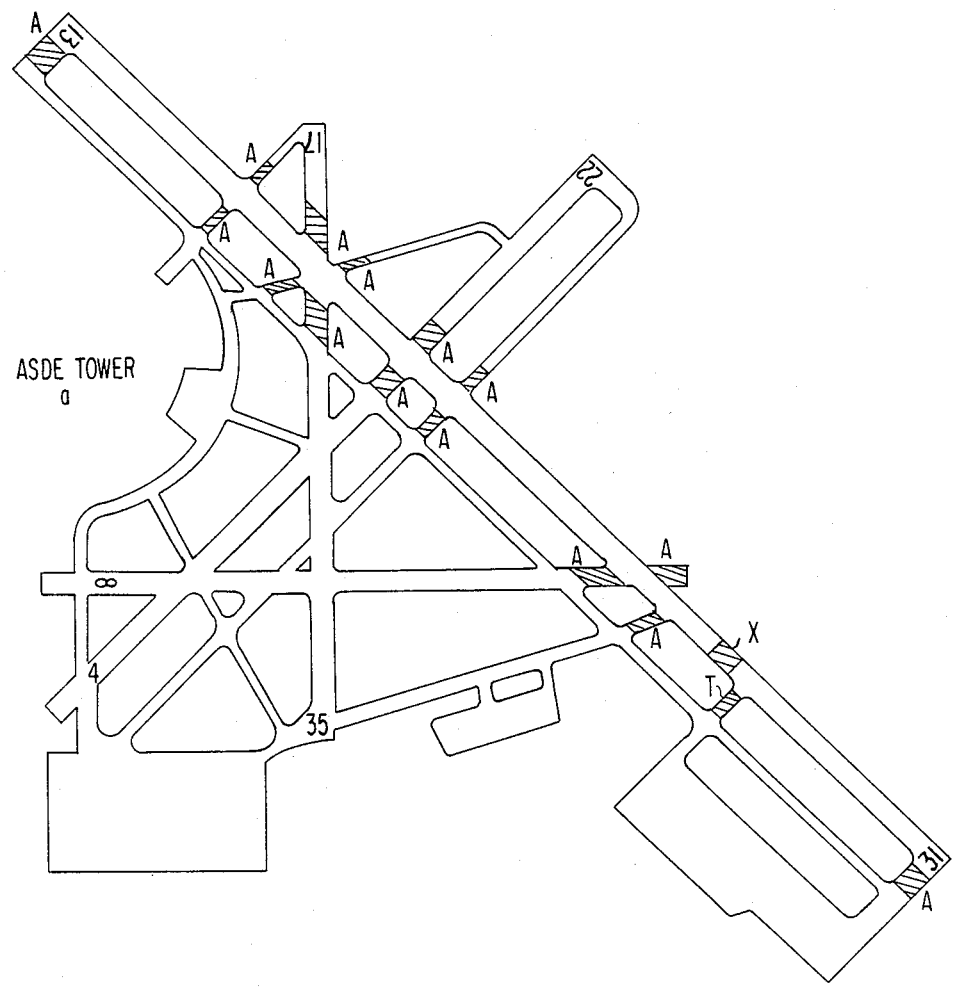

FIG. 3 is similar to FIG. 1, showing protection for operation on runway 13. There are two changes in FIG. 3 with respect to FIG. 1. Firstly, the B area has been eliminated to ensure that an aircraft landing on runway 13 will not be detected as having passed through the B area, which might occur with the arrangement shown in FIG. 1. Thus, in the embodiment of FIG. 3, protection for runway 13 uses the plural A barriers. A second change in FIG. 3 is the addition of X and T areas. The T area is a landing aircraft's intended turnoff location. Detection of a vehicle passing through the T area on a landing function indicates that the system protection may be torn down, i.e. the electronic barriers A, and T can be disabled. The X area can be used to ensure that, when sequential barriers X and T are violated, the violation of the T area is caused by a vehicle leaving the runway 13 and not by another vehicle entering or crossing the runway. In a takeoff function, the T area is not used and it is replaced by an A area.

Thus, FIG. 1 can be considered to locate electronic barriers used to protect aircraft taking off on runway 13, whereas FIG. 3 illustrates those electronic barriers used for landing function on runway 13.

Figure 7:
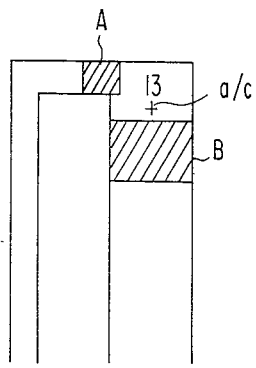
FIGS. 7 and 8 show modifications applicable to several of the FIGS. 1–5.

FIG. 7 shows how the barriers A and B (of FIG. 1) can be used to detect a vehicle's movement by noting sequential barrier violation. FIG. 7 shows the portion of runway 13 where an aircraft begins its takeoff roll, and overlays the barriers A and B on the runway. When the aircraft a/c is cleared for movement onto the runway, it will be detected moving to barrier A. When aircraft a/c begins its takeoff roll it moves into barrier B. Thus, the system is assured that the cleared aircraft a/c, and no other vehicle, has accepted the takeoff clearance and initiated the takeoff roll.

Figure 8:
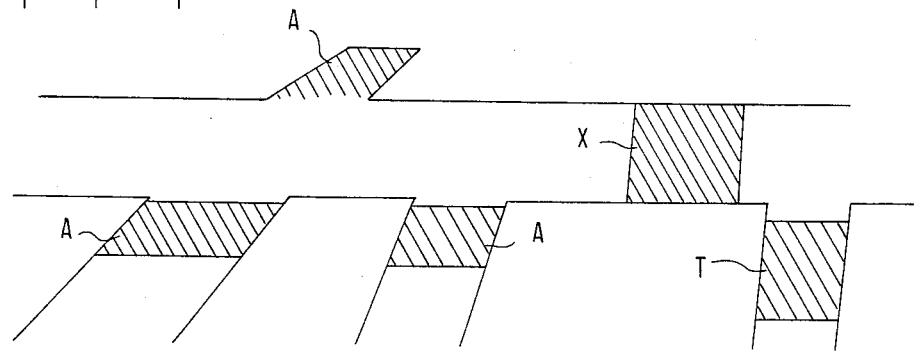

FIG. 8 shows the use of the same technique, in connection with a landing function on runway 13. FIG. 8 shows a portion of runway 13 in the vicinity of the turn-off barrier T. A barrier X is located on the runway preceding the turn-off. As will be clearly understood, the landing aircraft will penetrate barrier X and then, as it turns off runway 13, will penetrate barrier T. Only the sequential triggering of barriers X and then T will effect deactivation of protection. Triggering barrier T, alone, will be construed as an intruding vehicle, i.e. an alarm condition.

Figure 4:
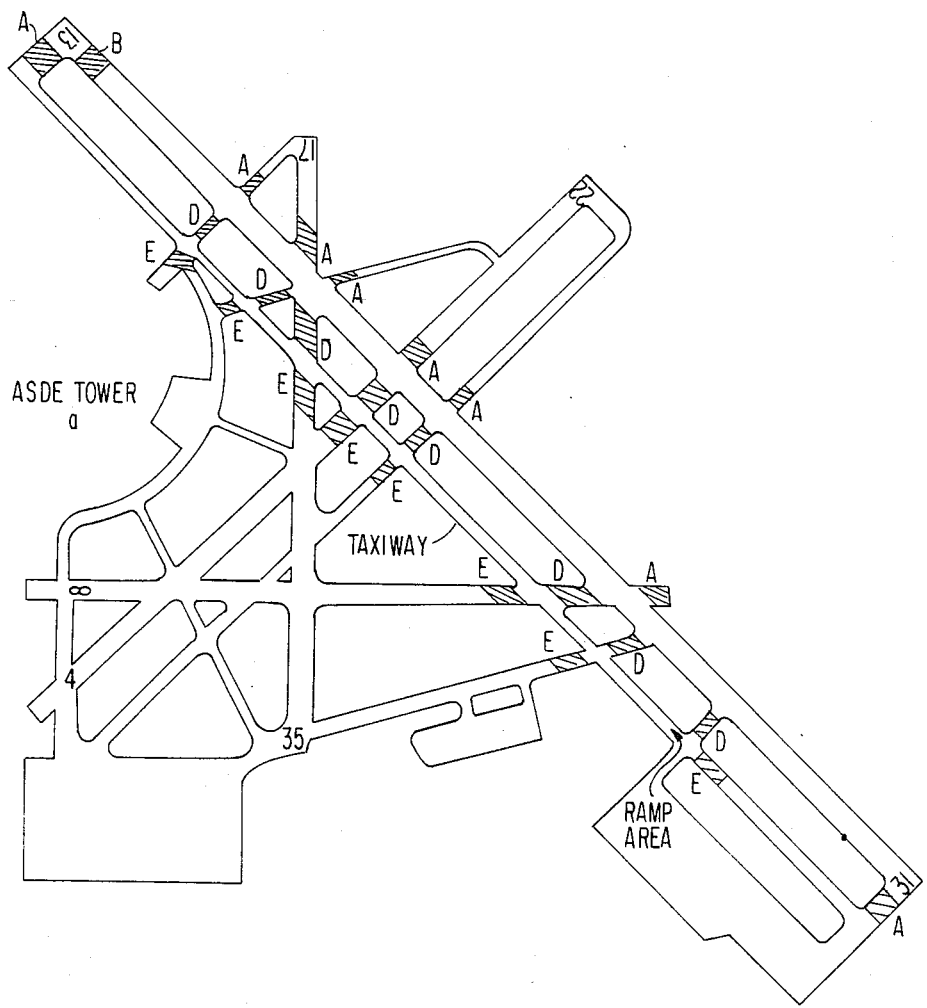

FIG. 4 is a similar illustration of a more advanced arrangement, illustrating again protection for runway 13. In this case, protection is also provided for an aircraft in taxiing to the runway. More particularly, the additional electronic barriers D and E have been added. Those A barriers in FIGS. 1 and 2, between the runway and the parallel taxiway, are designated D in this figure. Thus, protection of the runway uses A and D areas, while the taxiway is protected by D and E areas. The intended path for an aircraft taking off begins at the ramp area (where passengers embark) proceeds along the taxiway parallel to runway 13 to the far end of the runway, terminating in the holding area just prior to the electronic barrier B. If the taking off aircraft wanders off the taxiway, it must do so through one of the intersections protected by the electronic barriers D or E. The violation of one of these barriers will be indicated to the control tower personnel who can then communicate this to the pilot of the taxiing aircraft. Protection of the runway from intrusion is provided similar to the manner described in connection with FIGS. 1-3.

As can be perceived from the foregoing, protection for each different runway or taxiway path consists of a plurality of electronic barriers, and the barriers forming the protection for any particular runway fall into different classes or categories. Each barrier is separately and continuously examined if that barrier is required for a function which has been activated. There are many such areas, perhaps as many as a few hundred throughout the airport, but only the required ones are actuated at any specific time. The grouping of these barriers is under software control so that keyboard selection, a menu call-up or voice recognition actuation can activate the required path protection. For example, a voice command "take-off, one, three" activates the A, B and D barriers (FIG. 4) and "landing, one, three" would actuate A, D (FIG. 4), X and T (FIG. 8) barriers. In an analogous manner, "take-off, zero, four" would actuate A and C barriers in FIG. 2 while "take-off, two, two" would actuate A and B barriers. Those skilled in the art will recognize how keyboard selection or a menu displayed on a video display could be used.

The controller selects a set of barriers by designating a runway for use, and partially determines the characteristics of the different areas by selecting a function for the runway, e.g. takeoff or landing. To provide further flexibility, the areas can be operator-selectable both as to location and function. For example, designating a runway and a function can bring up or offer a set of default barriers with predetermined characteristics. However, the operator can override either the location of a barrier and/or its characteristic by means of further input, for example using a keyboard and/or a light pen or the like. The different classes of electronic barriers can be grouped according to function and include:

1. Sensing intrusion onto an active runway;
2. Sense movement towards takeoff;
3. Turnoff of the landing aircraft;
4. Sense a taxiing aircraft or other vehicle straying from or into the desired taxipath;
5. Other categories at the controller's option.

Thus, operator input identifies runway and function. Optional operator commands (or inputs) can also be used to selectively add to or subtract from a default set of active barriers previously selected for that particular function and runway. A barrier, of course, merely identifies a region in space, the radar return from which will be monitored.

To analyze the radar returns, the apparatus must first select returns from active barriers, process the returns to generate the "simulated" return for each barrier and store it in an accessible location. On succeeding scans, the appropriate returns must be selected and compared to determine if barrier penetration is involved. Then, depending on the particular barrier penetrated, a decision must be made respecting the appropriate response, i.e. alarm, deactivate protection or simply note for future use. As an example, penetration of one of the barriers A of FIGS. 1, 2, 3 or 4, when the associated runway has been cleared for take-off or landing, could well signal impending intrusion of a vehicle onto a runway which has been cleared for landing or take-off, i.e. a potentially dangerous situation. Accordingly, one appropriate response to the detection of such penetration is an alarm. On the other hand, detecting penetration of a barrier such as T (see FIG. 8) under circumstances in which barrier X had previously been penetrated, with the associated runway cleared for landing, could reasonably be taken as an indication that the aircraft has landed and now turned off the runway; under these circumstances, an appropriate response would be deactivating the protection for that particular runway. Finally, under circumstances of penetration of barrier X (again see FIG. 8) when the associated runway had been cleared for landing would be an example of a penetration, the detection of which merely requires noting for future use, i.e. to determine when the barrier T is later penetrated that it is the landing aircraft which has been detected.

Figure 5:
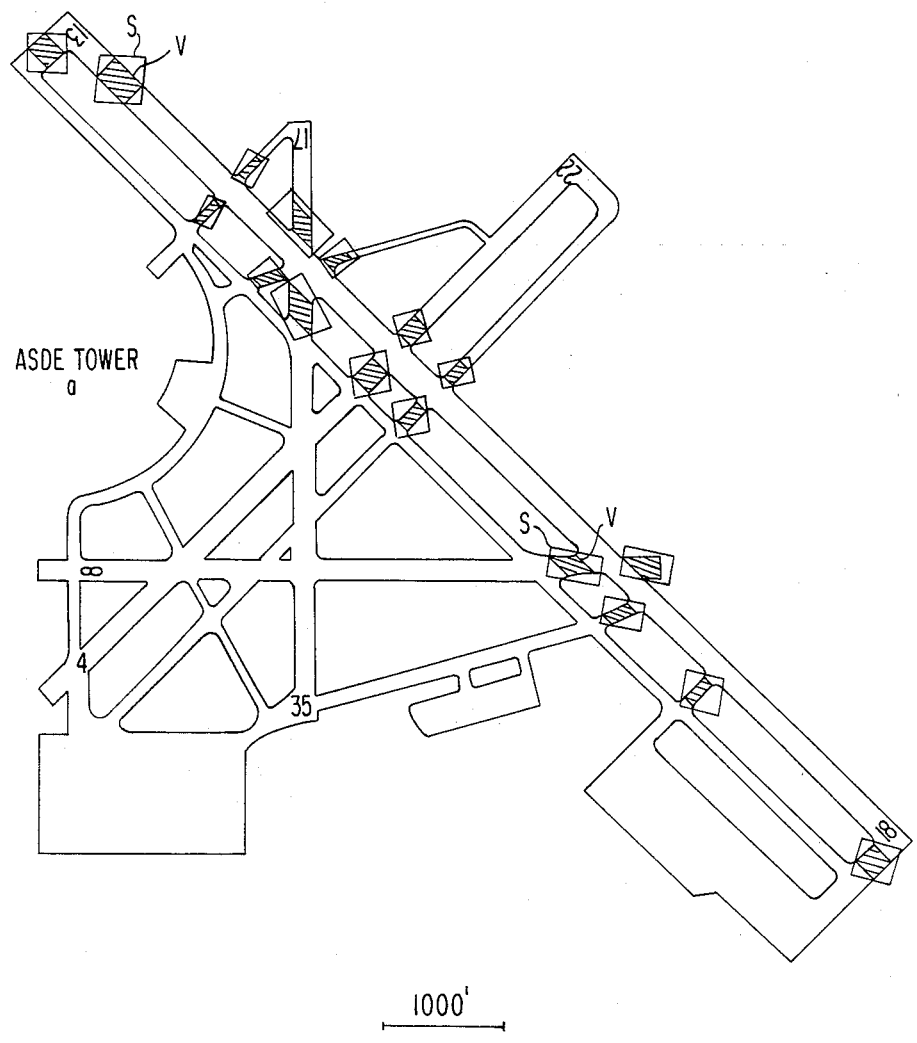
Figure 9:
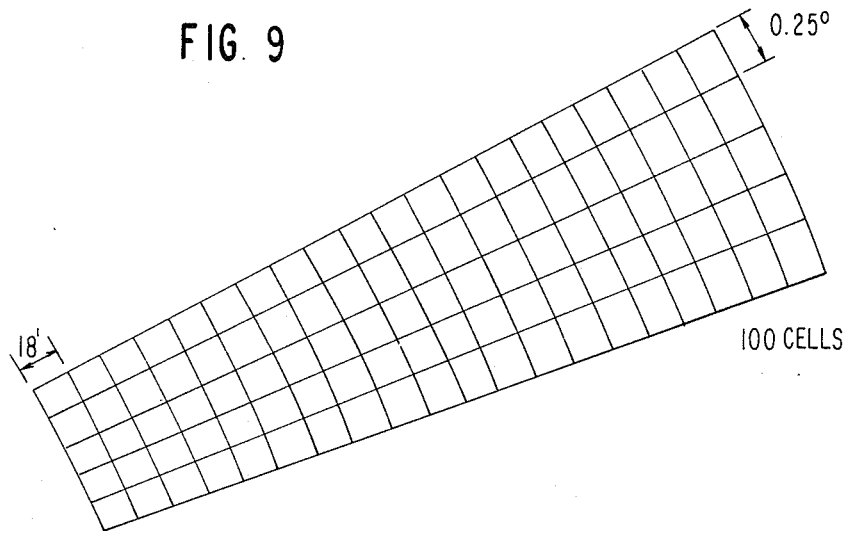
FIG. 9 is an exemplary illustration of a typical barrier and the elemental cells thereof.

Since the radar signal is emitted from a central point, any regions designated by four parameters of start and end azimuth and start and end range takes on shapes as shown in FIG. 9. That is, the region consists of an area bounded by segments of two straight, intersecting lines and two arcs of concentric circles intersecting the straight line segments. This region (or any such region) corresponds to predetermined time slices of a radar return signal. Depending on the range from the antenna and the width of the intersecting roadway, this region can always encompass the intersecting roadway but may well extend beyond that roadway to some extent. However, using techniques and apparatus described in U.S. Pat. No. 4,181,956, the barrier shape can be further refined. More particularly, several regions S, as defined above, are illustrated in FIG. 5. Inscribed with each region S is an actual barrier V. The barrier V is defined by selecting only that portion of the predetermined time slices of the radar return which correspond to the region V inscribed within the region S.

Figure 6:
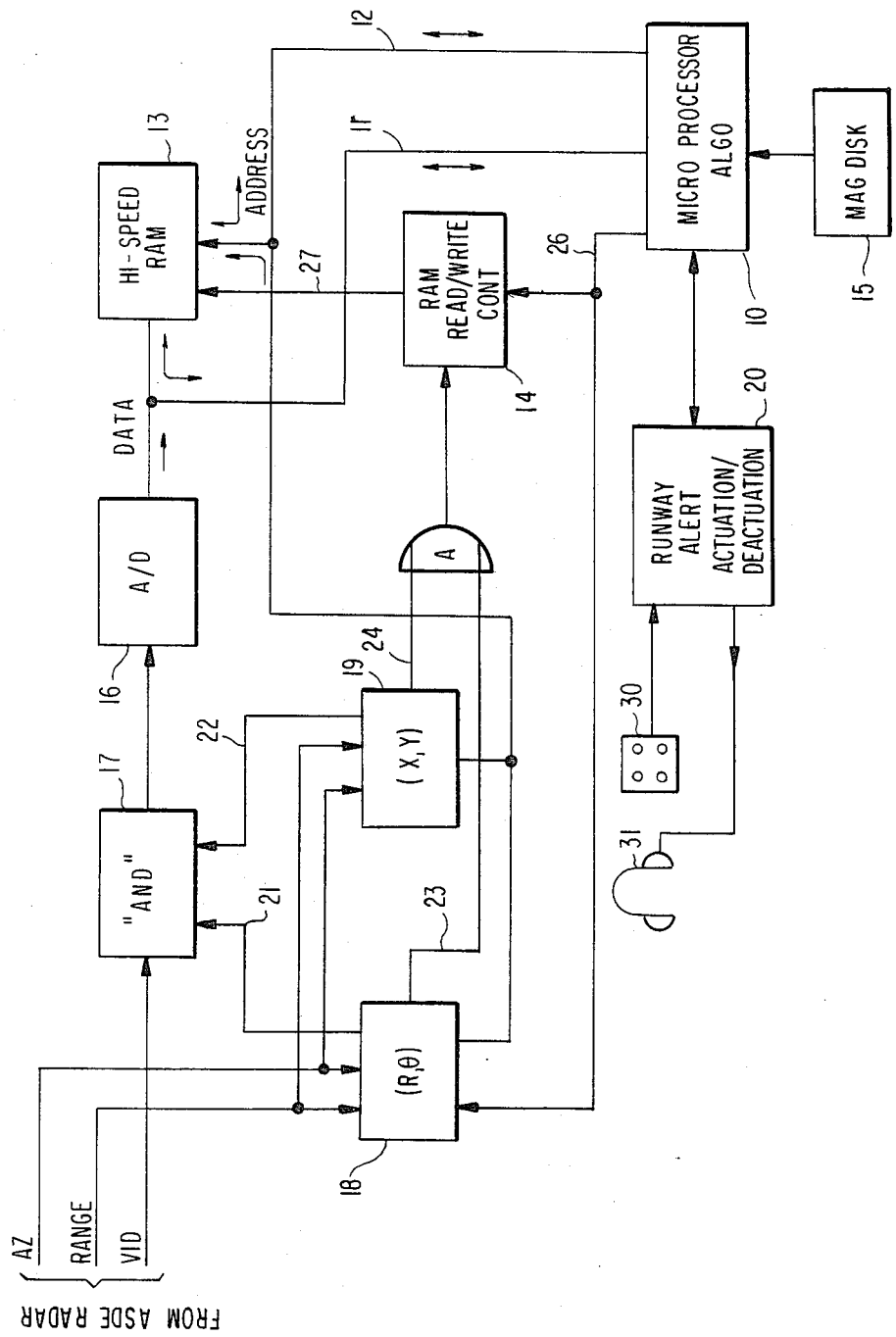
FIG. 6 is a block diagram of the inventive apparatus.

FIG. 5 illustrates how the detection is implemented in one embodiment of the invention. FIG. 5 is the same runway plan over which has been overlaid a series of barriers V. FIG. 9 shows the test area used at FAATC, which was comprised of 100 cells, each 18 feet×0.25°. The cells were range/azimuth ordered, 20 cells long in range×5 azimuth sticks. The R,θ coordinates are quite compatible with the ASDE-3 or comparable radars. FIG. 5 shows 17 barriers (the hatched areas V) of varying range length and azimuth sticks, each of which is inscribed within a succession of R,θ boxes S. Clearly the boxes S are of different cell count (i.e., not necessarily 100), different range length (i.e., not necessarily 20 cells) and different azimuth count (i.e., not necessarily 5). So long as the R,θ boxes S in use at one time do not overlap, it is a straight-forward problem to select the video return from each of the boxes S, and select within this group of returns, returns corresponding to the barriers V and store a digitized version of the return in a proper, known location in digital memory. FIG. 6 shows apparatus to perform these functions.

As shown in FIG. 6, a microprocessor 10 is coupled to a mass storage device such as a magnetic disk 15 and is subject to inputs from the runway alert activation/-deactivation apparatus 20. While representation of a microprocessor illustrates the limited processing power required to implement the invention, those skilled in the art will realize that other, larger, digital processors could also be used. The microprocessor 10 is coupled via tri-state, bidirectional data and address busses 11 and 12 to a high-speed RAM 13 and to an RAM read/write controller 14. Another input to the high-speed RAM 13 is provided by an analog-to-digital converter 16 which, in turn, is subjected to the output of a gate 17. The data input to the gate 17 is radar video, and the control inputs are provided by a pair of register/comparators 18 and 19, each of which receives as an input real time azimuth and range signals from the same radar equipment.

The register comparator 18 includes storage for R,θ coordinates for regions S, that is beginning range, ending range, beginning azimuth and ending azimuth. As each radar scan develops, of course the azimuth, range inputs to the register/comparator 18 continually change. The register comparator 18 compares, in turn, present range and azimuth with the register-stored coordinates identifying various regions S. When real time range and azimuth input signal lies between the beginning and end range and azimuth, the register/comparator 18 provides an enabling output on a conductor 21, forming one of the control inputs to the gate 17.

The register/comparator 19 performs a slightly different function from the register/comparator 18, in response, however, to the same input signals. Reference to FIG. 5 illustrates that the barriers V (within the region S) do not encompass the entire region S. The register/comparator 19 includes a set of registers for each different region S describing the included barrier V in the manner explained in U.S. Pat. No. 4,181,956. The register/comparator 19 allows radar returns from an area in space to be selected wherein the area is bounded by curves or lines connecting a set of points. Notwithstanding the polar nature of the radar return, the lines or curves defining the area need not be defined in polar terms. A relatively simple case is an area bounded by four lines which are not necessarily parallel to each other or to the range coordinate. The register/-comparator 19 includes an output conductor 22 which forms the second control input to the gate 17. A description of one implementation of the register/comparator 19 is described in U.S. Pat. No. 4,181,956 entitled "Indicia Display with Compressed Data".

During those portions of the scan in which enable signals are provided to the gate 17 on conductors 21 and 22, the video input is passed to the analog-to-digital converter (A/D) 16. Thus, the gate 17 selects predetermined time slices of the radar video. The analog-to-digital converter 16 digitizes the video and passes the digitized video onto the data input of the high-speed RAM 13. In an embodiment of the invention actually constructed, the high-speed RAM 13 has a capacity of 4096 8-bit words. This translates to simultaneously handling up to 40 barriers, each including 100 cells. The high-speed RAM 13 is actually used as a temporary data buffer and block sorter before inputting data to the microprocessor 10.

As stated above, the register/comparator 18 and register/comparator 19 store designation of barriers in different forms, the register/comparator 18 stores that designation in R, θ coordinates, whereas the designation in the register/comparator 19 can be stored in cartesian form. It is theoretically possible for both the register comparator 18 and the register/comparator 19 to store designations of all possible barriers. On the other hand, either or both register/comparators 18 and 19 can store designation of only those barriers actually in use, i.e. previously actuated by a command and not yet de-activated. If either the register/comparator 18 and/or the register/comparator 19 stores designation of only barriers in use, then the gate 17, based on its input signals, selects those predetermined time slices of the radar video which actually correspond to barriers in use, and all the data that is passed to the A/D converter 16 and following equipment will be processed. On the other hand, if this selection is not made, because both the register/comparator 18 and the register/comparator 19 store designation of all possible barriers (and not only the selected barriers) then some other apparatus is necessary to make this selection. As will be described below, that other apparatus exists in the form of the read-/write control 14. Preferably, however, identification of all barrier locations are stored in the register/comparator 19, whereas only those actually in use are stored in the register/comparator 18. To this end, the microprocessor CPU 10 is coupled, over bus 26 to the register/comparator 18, for writing therein identification of those barriers actually in use, and for also deleting designation of barriers which are to be de-activated.

Both the register/comparators 18 and 19 provide control inputs, on conductors 23 and 24 to a RAM read/write control 14 indicating whether or not present range and azimuth lies within a selected region S (for the register/comparator 18) or barrier V (for the register/comparator 19).

Although gate 17 with two control inputs, from conductors 21 and 22 is illustrated in FIG. 6, those skilled in the art will understand that an additional AND gate (not illustrated) could be used to combine the control signals on conductors 21 and 22, and the output of the unillustrated AND gate used as the single control input for AND gate 17. A RAM read/write control 14, in response to the outputs on the conductors 23 and 24 provides an enabling input to the high-speed RAM 13. In case that selection of barriers in use is made by control 14, that control responds to tags identifying barriers in use to enable RAM 13.

Figure 11:
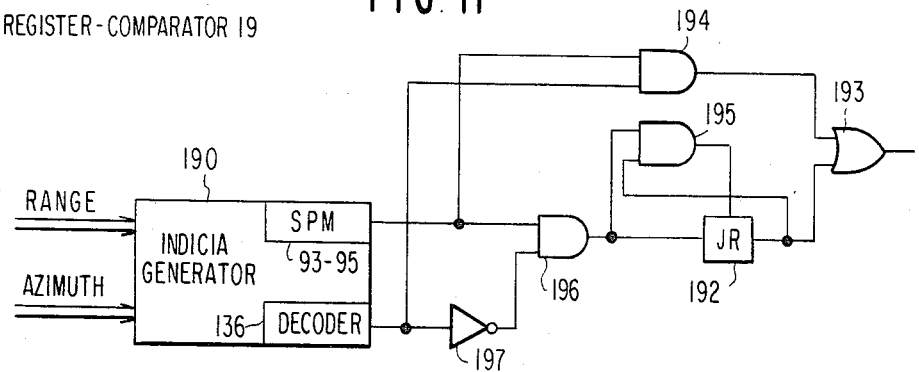
FIG. 11 illustrates how the signals produced by the apparatus of U.S. Pat. No. 4,181,956 can be used to provide one control signal for the AND gate 17 (FIG. 6)

U.S. Pat. No. 4,181,956 describes how indicia displaying signals are outputted from a trio of scratch pad memories 93–95, synchronous with the radar range clock (see in particular FIG. 13A of that patent) where the indicia defining signals are stored in compressed form. The barrier's position and shape is likewise stored in compressed form, one record per side, for example. Whereas in the patent the display is used to outline the barrier, in the present invention, the output of register/comparator 19 is used to control gate 17. FIG. 11 shows an arrangement to use the scratch pad memory output to produce the necessary control signal.

As shown in FIG. 11, an indicia generator 190 (which is the register/comparator 19) is subjected to range and azimuth signals from a conventional radar equipment. The indicia generator 190 corresponds to the apparatus shown in FIG. 13A of the patent, and the azimuth input is referenced as ACP whereas the range clock input is illustrated as being derived from a range clock. As shown in FIG. 13A, the apparatus includes three scratch pad memories 93–95, one of which is active at a time providing an output to a video mixer defining an indicia sought to be displayed.

Figure 12A:
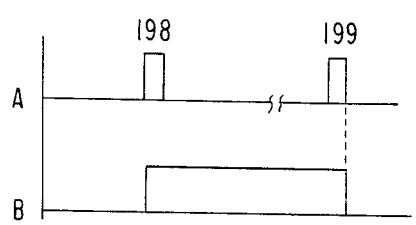
FIG. 12A illustrates the signals produced by the apparatus of U.S. Pat. No. 4,181,956 for two different cases
Figure 12B:
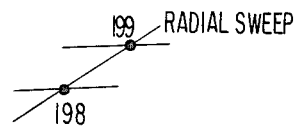
FIG. 12B shows the radial sweep and two intersections of the sweep with two line segments.

As described in the patent, the indicia sought to be displayed can be at any angle to the polar coordinate system; when the indicia is directed radially, however, the display is handled in a mode different from otherwise. FIG. 12A illustrates the output of the scratch pad memory under these two different circumstances. In the first circumstance, where a radial sweep (of FIG. 12B) intersects two boundaries of a barrier, e.g. at points 198 and 199 (see FIG. 12B), then the scratch pad memory on that particular azimuth sweep provides two pulses, one corresponding to intersection 198, the other corresponding to intersection 199. Line B of FIG. 12A shows a special case wherein the boundary of the indicia or barrier is coincident with the radial sweep, and in this case the scratch pad memory puts out a pulse which begins at the beginning of the boundary barrier, e.g. point 198, and terminates with the end of the barrier, e.g. intersection 199.

Figure 10:
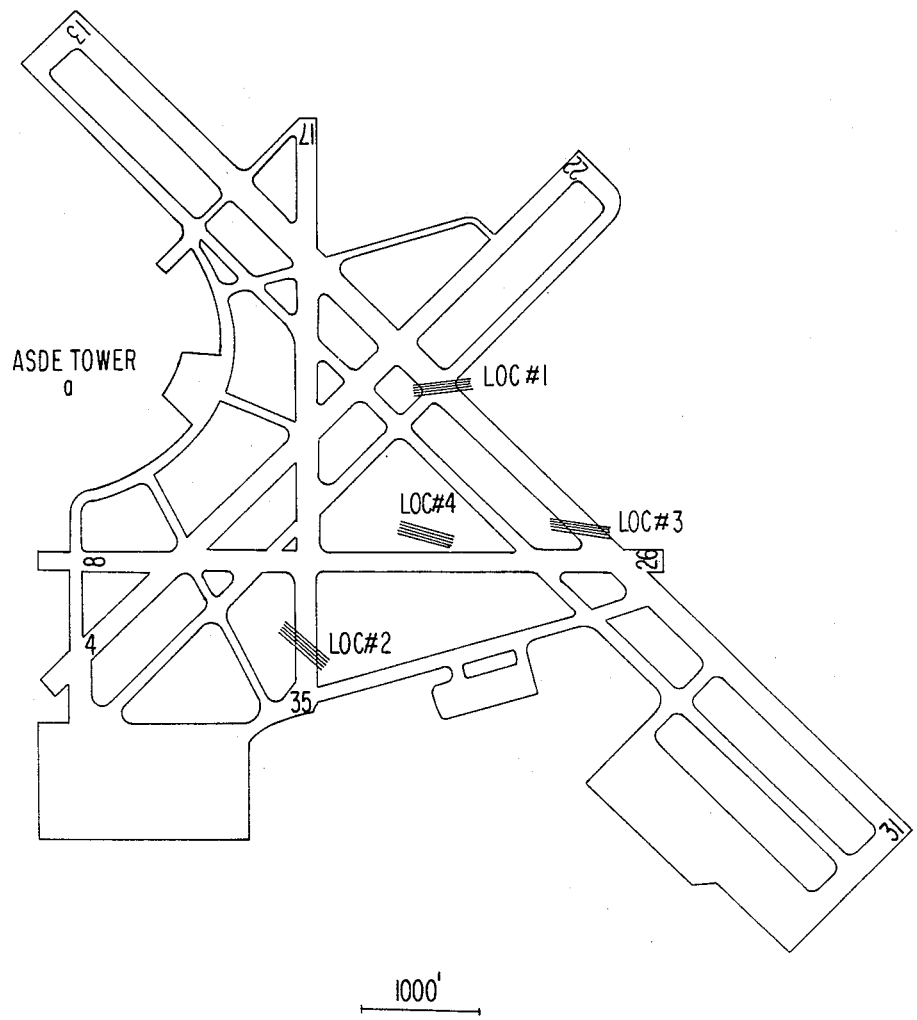

Accordingly, for the special case wherein the boundary of the barrier is coincident with the radial sweep, the output of the scratch pad memory can be used directly as the control pulse to the gate 17. On the other hand, in the normal case it is necessary for auxiliary apparatus to develop a pulse extending between pulses 198 and 199. The auxiliary apparatus to effect this is shown in FIG. 11. The output of decoder 136 (see FIG. 10A of the patent) is high for indicia coincident with a radial sweep, and at other times is low. This output is coupled to an inverter 197 whose output is coupled as one input to an AND gate 196, the other input to AND gate 196 is provided by the scratch pad memory SPM. The output of the scratch pad memory SPM is also provided as one input to an AND gate 194, whose other input is the output of the decoder 136.

Accordingly, for the general case, the AND gate 196 is enabled for each of the pulses 198 and 199. On pulse 198, the output of AND gate 196 is used to set a flip-flop 192, and the set output of the flip-flop 192, coupled through OR gate 193 is the control input to the AND gate 17 (of FIG. 6 of this application).

On production of the second pulse, e.g. pulse 199, the AND gate 196 is again satisfied. However, at this time, since the flip-flop is already set, AND gate 195 is satisfied to thus reset the flip-flop 192 and terminate its set output, to terminate the control signal to AND gate 17. Accordingly, for the general case (e.g. a non-radially directed boundary of a barrier) the OR gate 193 provides a control pulse to AND gate 17 which exists for that time slice of a particular radial sweep coincident with the barrier.

Under those circumstances where the boundary of a barrier is coincident with a radial sweep, AND gate 196 is disabled, but during the portion of time when the sweep is co-extensive with the barrier, AND gate 194 is satisfied to thus provide a control signal via OR gate 193 to the AND gate 17.

Accordingly, it should be apparent how AND gate 17 is controlled in connection with the apparatus more completely described in prior U.S. Pat. No. 4,181,956 to select that portion of a radar return corresponding to a barrier, where the barrier is defined in terms of one or more records, each of which defines one of the boundaries of the barrier.

The register/comparators 18 and 19 also provide an output, on a tri-state bus 12. Tri-state bus 12 therefore carries a sequence of tagged addresses for addressing the high-speed RAM 13 to place the corresponding digital words (from the analog-to-digital converter 16) in appropriate locations.

The microprocessor 10 is coupled to the high-speed RAM 13 via data and address busses 11 and 12, respectively. The microprocessor 10 also provides a control output via a conductor 26 to the RAM read/write control 14 and also optionally to register/comparator 18 as described above. When RAM read/write control 14 receives an appropriate input, either on conductors 23, 24 or 26, it enables the high-speed RAM 13 over a conductor 27.

The function of microprocessor 10 is to repetitively effect the comparison for each barrier in active use against the appropriate simulation for that barrier. Depending on the particular simulation signal desired, the microprocessor 10 may also process a return or a previous set of returns to generate a simulated signal for the comparison function. Finally, in the event that there is a difference between the active barrier return and the simulated return (which exceeds a threshold which may be set by the microprocessor 10), then depending on the type of barrier, and prior circumstances, the microprocessor 10 may or may not output a signal to the runway alert activation/deactivation block 20 to provide a warning or alert to the controller.

Figure 14:
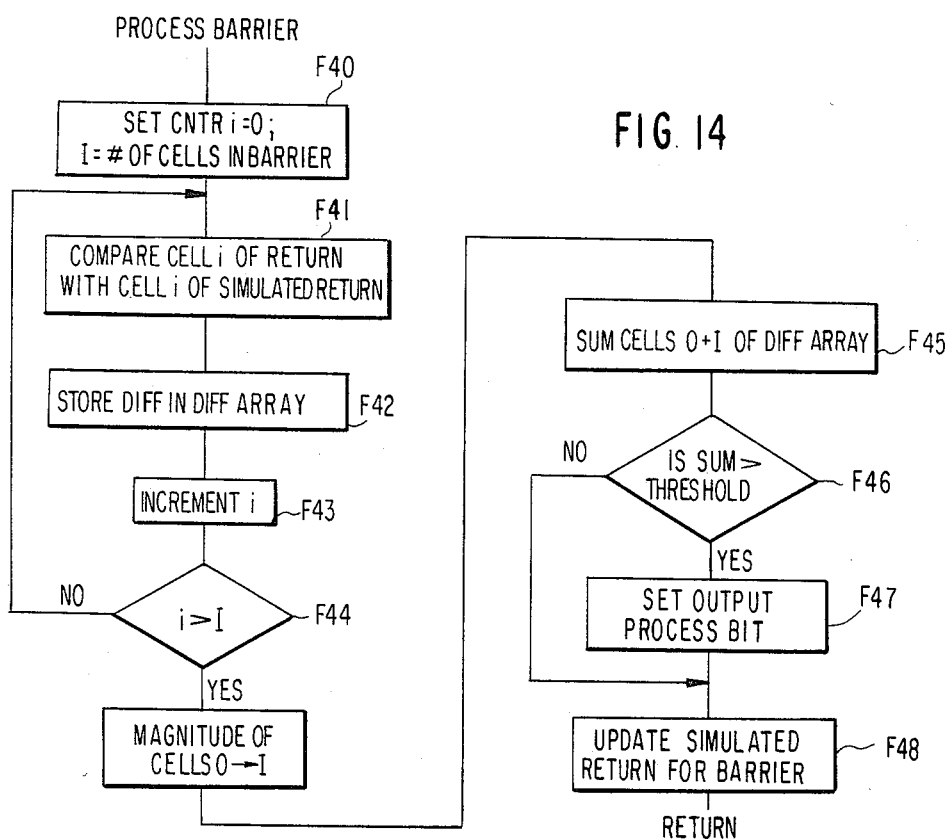
FIGS. 13 and 14 are flow diagrams of processing performed by the microprocessor 10 (FIG. 6).
Figure 13:
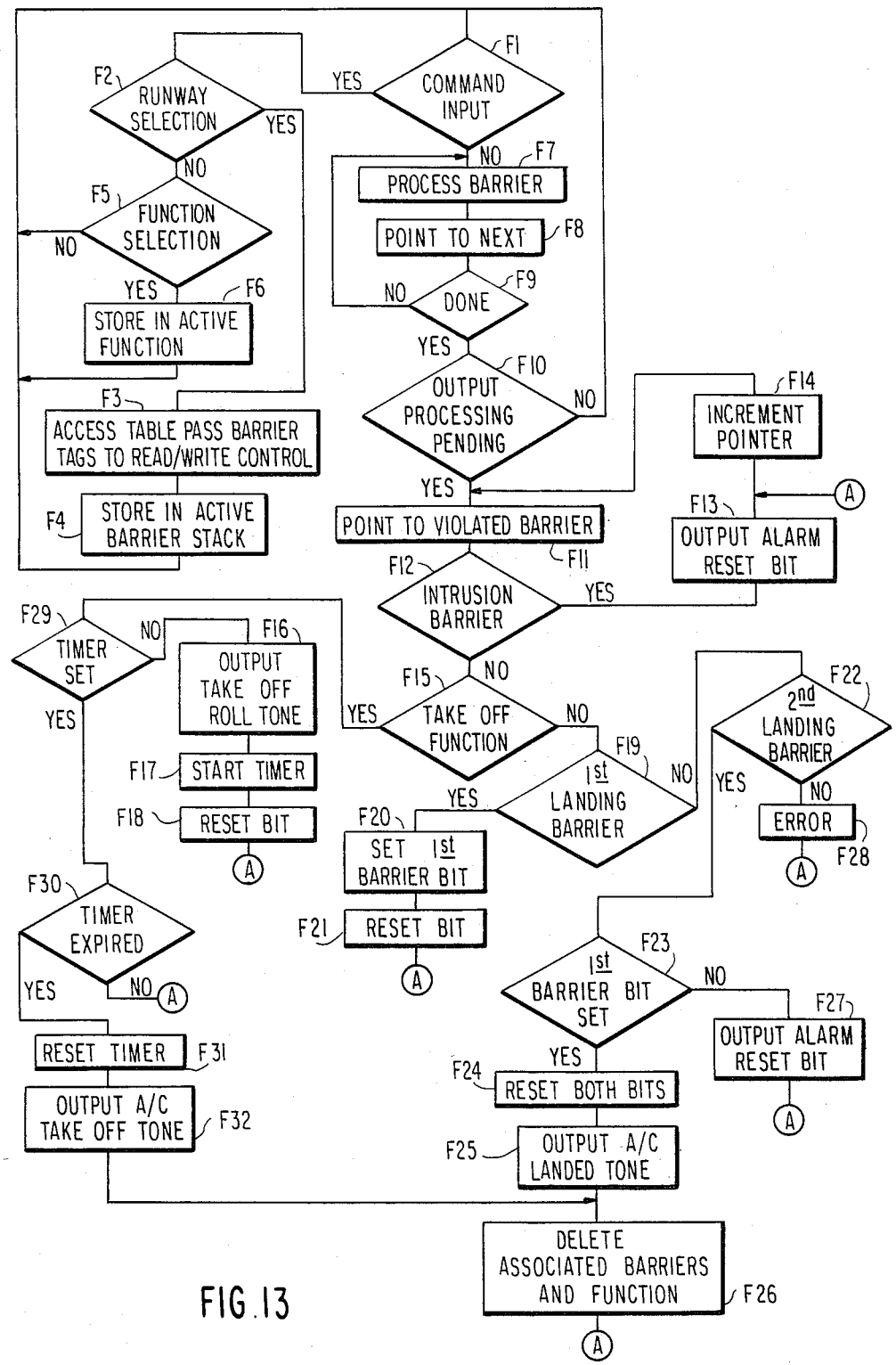

An appropriate processing routine for the microprocessor 10 is shown in FIGS. 13 and 14.

What is described in the following paragraphs is a sequential (or fall through) logic selection to categorize which processes are selected and alarmed. It is recognized that these sequential steps may be replaced with an N-way branch or with a "case of" statement a la Pascal. Externally, these appear the same to an observer and, although detail wise are somewhat different, function wise they are the same. The example which is illustrated and described is selected due to its clarity and ease of understanding.

The main processing routine of the microprocessor 10 can be broken down into three different segments, input processing, processing of returns and output processing. As shown in FIG. 13, this processing is combined in an endless loop. A decision block F1 determines if a command input (from the runway alert actuation/deactuation circuit 20) has been detected. If it has, function F2 determines if a runway selection has been made. If it has, function F3 accesses a table correlating each runway with a set of a barriers associated with that runway. On runway selection then, the microprocessor 10 passes the tags identifying each associated barrier to the read/write control 14. This allows the read/write control 14 to enable the high speed RAM 13 to accept video input only for barriers which have been activated. In the event that register/comparator 18 designates only barriers in use, as is preferred, this same function (F3) passes barrier designation to register/comparator 18. Function F4 stores the barrier tags in an active barrier stack for later processing.

On the other hand, if the command input had been a function selection, then function F5 would have enabled function F6 to store the active function in a function table. At the conclusion of either of these set of functions, the processing loops back to function F1.

After the command inputs have been processed, or if there are no presently unprocessed command inputs, function F7–F9 processes the radar returns. More particularly, function F7 processes a return for a single barrier, and function F7 is shown in more detail in FIG. 14. Function F8 points to the next barrier to be processed and function F9 determines if all barriers have been processed. If not, the processing loops back to function F7. If all barrier processing is completed, then function F10 determines if any output processing is pending.

If output processing is not pending, processing loops back to function F1. Output processing will be pending if the microprocessor 10 has identified, in the course of processing function F7, that one or more barriers have been violated. Therefore, function F11 points to a violated barrier. Function F12 determines if that is an intrusion barrier (i.e., the barriers A of FIGS. 1–3). If it is an intrusion barrier, then function F13 outputs an alarm to the operator and resets a bit indicating that output processing is required for this barrier. The alarm, as indicated above, may be either a simple tone, a voice synthesizer, or a video display or a combination of the foregoing. Following function F13, function F14 increments a pointer to point to the next barrier to be processed.

If the barrier which is being pointed to at function F11 is not an intrusion barrier, then function F15 determines if a takeoff function is being implemented. If it is, then there is only one other type of barrier, and that is a takeoff roll barrier (or trip location). Function F29 is executed to detect if a roll timer is set. If it is detected that the timer is set, then function F30 is performed to check if the timer has expired. If the timer has not yet expired, processing skips through point A. If the timer has expired, then function F31 resets the timer and function F32 outputs a tone indicating that the aircraft has completed the takeoff, and the processing skips to F26 to delete the associated barriers and takeoff function. If a timer was not set (at F29), then function F16 outputs a takeoff roll tone to alert the controller that an aircraft is rolling toward takeoff. As in the case with function F13, the tone or output can take a variety of forms. Function F17 starts a timer and function F18 resets the violated barrier bit. Processing then skips to function F14 which has already been explained.

On the other hand, if function F15 determines that a takeoff function is not being implemented, then function F19 determines if this is a first landing barrier (i.e. the barrier X or priming location). If it is, then function F20 sets the first barrier bit (to indicate that the first barrier, X barrier or priming location has been violated) and function F21 resets the barrier violated indicating bit.

If the landing function is being implemented but it is not the first landing barrier that is violated, then function F22 determines if it is the second landing barrier (or disabling location) that has been violated. If it is, function F23 checks to see if the first barrier bit is set. If it is, then this is an indication that the landing aircraft has passed through both the barriers X and T and has thus turned off the runway. Accordingly, function F24 resets both the first barrier bit and the barrier violated bit. Function F25 outputs the aircraft landed tone. The output can take any of a variety of forms as already discussed. Function F26 deletes the associated barriers and function from the active function table and the active barrier stack; since the aircraft has turned off the runway, protection of the runway for the aircraft is no longer necessary.

On the other hand, if the first barrier bit had not been set (as determined at function F23), then function F27 outputs an alarm and resets a bit much as in the case of function F13. In this case, since only the barrier T has been violated, an intrusion rather than a landing aircraft is indicated.

Finally, if neither the first or the second landing barrier, nor an intrusion barrier has been violated, but a takeoff function is not in progress, then function F28 identifies an error condition and the processing skips to point A.

The functions performed in processing a particular barrier is shown in more detail in FIG. 14.

As shown there, function F40 sets a counter i to zero, and sets a parameter I equal to the number of cells in this particular barrier. Thereafter, functions F41 and F42 obtain the difference, for each cell, between the simulated return and the return, and store the difference in a difference array. Function F43 and F44 increment the counter i and check to see if all cells have been completed. If not, the processing loops back to function F41. If all cells are completed, function F45 sums the cells i=0 to I of the difference array and function F46 compares the sum to a threshold. If the sum is greater than the threshold, function F47 is performed to set an output process (or barrier violated) bit requiring output processing; and if the sum is not greater than the threshold, then function F47 is skipped. Thereafter, function F48 updates the simulated return for the barrier and the processing returns to that shown in FIG. 13.

The preceding description of the flow chart in FIG. 14 has not specifically treated the algebraic sign of the different cells in the difference array. Since the difference array is, by definition, computed as a difference between a real time radar return (which has a polarity) and a corresponding cell in a simulated return (which may also have a polarity), the quantity in each of the cells in the difference array can take on either positive or negative polarity. Merely summing the quantity in each of the different cells in the difference array (in function F45) can draw objection in that there is a possibility that algebraic summation of one large positive difference, with another large negative difference, may produce a relatively small algebraic sum which may not activate an alarm when in fact the differences were quite large (at least in terms of absolute value) and should have activated the alarm. An alternative procedure is to provide a step in between steps F44 and F45, which replaces the difference array by the absolute value of the difference array; this removes the objection that some "information" can be lost by different polarities of differences. Alternative to this alternative is an additional step, located between steps F44 and F45 which replaces the difference array with a modified difference array in which the quantity in each cell is the square of the quantity in the original difference array; this too removes the effect of polarities. Penetration or violation of a barrier is declared when the sum exceeds the threshold. As expected, due to stability of the apparatus and particularly stability of the target returns, the threshold value could be set differently for different detect or intrusion areas. A reasonable approach seems to be one in which we determined the average value of the sum, and computed its root mean square value and then computed the threshold value. This, in effect, established a false alarm rate for the case of no barrier violation. The threshold was scaled to produce an acceptable false alarm rate which was arbitrarily selected at $1.15 \times 10^{-5}$, or once per day. Those skilled in the art will understand that this is not the only algorithm that is capable of operating. However, the algorithms described here are straight forward to implement.

As shown in FIG. 6, the runway alert actuation/deactuation circuit 20 accepts inputs from a keyboard 30 for the microprocessor 10 and accepts outputs from the microprocessor 10 to produce different tones to a headset 31. The particular circuitry to effect these functions, i.e. to format signals produced by a keyboard 30 for input to the microprocessor 10 and to translate particular output signals from the microprocessor 10 to specify tones, are well within ordinary skill and thus no further description is necessary.

However, it is equally within the scope of the invention to substitute a voice activated input device for the keyboard 30; and in that event the runway alert actuation/deactuation circuit 20 includes a microphone input, and other conventional circuitry to recognize a limited repertoire of audio input commands, and to translate those commands into signals suitable for the microprocessor 10. Since voice response devices are available commercially, no further description of this equipment is believed necessary.

Finally, it has also been mentioned that a light pen could also be used as an input device either to specify the barriers to be activated or to select from a default set of barriers, a subset of barriers so that the subset will not be activated and/or only the subsets which are selected will be activated. Again, light pen devices are conventional and no further description of this equipment is believed necessary.

We claim:

1. Apparatus for processing radar return video signals in the vicinity of an airport including at least one runway and at least one vehicle roadway intersecting said runway, said apparatus comprising:
   first means responsive to a command input representing a selected function and a selected runway to select a set of geographical monitored locations from plural sets of monitored locations,
   second means responsive to a real time video signal from a radar apparatus for repeatedly isolating radar returns from each geographic monitored location in said selected set,
   third means for repeatedly comparing radar returns from each of plural geographic monitored locations with a simulated return for each corresponding location to detect a moving object at any of said geographical monitored locations, and
   alarm means responsive to detection of a moving object by said third means for alerting an operator to the presence of said moving object.

2. The apparatus of claim 1 in which said first means further selects a trip location associated with said selected set of monitored locations,
   said second means repeatedly isolates radar returns from said trip location,
   said third means repeatedly compares radar returns from said trip location with a simulated return from said trip location to detect a moving object at said trip location, timing means responsive to said third means detecting a moving object at said trip location for timing a predetermined interval, and fourth means responsive to expiration of said predetermined interval to deselect said set of geographic monitored and trip locations.

3. The apparatus of claim 1 in which said first means further selects a disabling location associated with said selected set of monitored locations, said second means repeatedly isolates radar returns from said disabling location, said third means repeatedly compares radar returns from said disabling location with the simulated return from said disabling location to detect a moving object at said disabling location, and fourth means responsive to detection of a moving object at said disabling location for deselecting said set of geographic monitored and disabling locations.

4. The apparatus of claim 3 in which said first means further selects a priming location associated with said selected set of monitored locations, said second means repeatedly isolates radar returns from said priming location, said third means repeatedly compares radar returns from said priming location with the simulated return from said priming location to detect a moving object at said priming location, and said fourth means is inhibited from operation unless said third means first detects an object moving through said priming location before detecting an object moving through said disabling location, and fifth means responsive to inhibition of said fourth means for stimulating said alarm means for alerting an operator to the presence of said moving object.

5. The apparatus of any of claim 2, 3 or 4 which includes alerting means for alerting an operator in response to operation of said fourth means.

6. Apparatus for processing radar return video signals for providing signals indicative of potentially hazardous situations in response to operator input commands comprising:

command means for designating at least one function/runway pair identifying a specific runway reserved for a specific function, selecting means for selecting those time slices of said video signals which are identified by a particular function/runway pair designation for processing, first means for digitizing and storing representations of said time slices selected by said selecting means, processing means for comparing said digitized representations for identifying evidence of a moving object, and alarm means responsive to said processing means for manifesting said moving object.

7. The apparatus of claim 6 in which said selecting means includes comparison means for comparing real time range and azimuth signals to reference boundary data representative of coordinates of intersection with a runway, a gate with an input, a control input and an output, means for providing an enable signal to said control input in response to an output of said comparison means, means connecting said radar return video signal to said input of said gate, and means connecting said output of said gate to said first means.

8. The apparatus of claim 7 in which said comparison means is responsive to said command means for employing as reference boundary data, coordinates of intersection of reserved runways.

9. The apparatus of claim 7 which further includes:

control means coupled to said first means and responsive to said command means for storing only representations of said video signal corresponding to intersections of reserved runways.

10. The apparatus of claim 6 in which said processing means is responsive to said command means and to said digitized representations for deleting designations of a selected function/runway pair.

11. The apparatus of claim 6 in which said command means includes a keyboard.

12. A method of monitoring vehicle ground movements to detect violations of protected roadways comprising the steps of:

a. sweeping an area encompassing said protected roadways with microwave energy in a cyclical pattern, b. deriving a video signal from reflected microwave energy, c. selecting predetermined time slices of said video signal corresponding to intersections of a protected roadway with other roadways, in each of a number of said cyclical sweeps, d. comparing at least one of said predetermined time slices of said video signal in one sweep with a first simulated signal related to said predetermined time slices in a prior sweep, and e. producing an alarm in the event said predetermined time slices of said video signal differs from said simulated signal by more than a predetermined threshold.

13. The method of claim 12 in which said step (c) includes the steps of:

i. selecting a roadway to be protected from a plurality of roadways, ii. determining from said step (i) a geographical location for each intersection between said protected roadway with other roadways, and iii. determining from said step (ii) a set of time slices of said video signal corresponding to each said intersection.

14. The method of claim 13 which further includes the additional steps of:

iv. selecting a function to be performed on said roadway from a set of functions, v. determining from said steps (i) and (iv) at least one terminating geographical location, vi. determining from said step (v) a set of terminating predetermined time slices of said video signal corresponding to said terminating geographical location, vii. comparing at least one of said terminating predetermined time slices of said video signal in one sweep with a second simulated signal related to said terminating predetermined time slices in a prior sweep, and viii. terminating said monitoring in response said comparison indicating that a terminating predetermined time slice of said video signal exceeds said second simulated signal by a predetermined threshold, or more.

15. The method of claim 14 in which, in said step (viii) said terminating is performed substantially simultaneous with said comparison.

16. The method of claim 14 in which said step (viii) is performed a predetermined time subsequent to said comparison.

17. The method of claim 15 in which said step (v) includes:
(1) determining one priming location on said protected roadway and one disabling location off said protected roadway, said step (vi) including the steps of:
(2) determining a set of predetermined time slices of said video signal corresponding to each said priming and disabling locations of step (1), and said step (viii) includes the steps of:
terminating said monitoring in response to detection of disabling location time slices which exceed by at least said threshold, said second simulated signal but only if priming location time slices, previously detected had exceeded, by said threshold or more, second simulated signals.

* * * * *